United States Patent [19]

Swanson

[11] Patent Number: 4,934,857
[45] Date of Patent: Jun. 19, 1990

[54] CO-CONIC FASTENER AND FASTENING METHOD

[75] Inventor: Kurt W. Swanson, Kent, Wash.

[73] Assignee: General Dynamics Corporation, Convair Division, San Diego, Calif.

[21] Appl. No.: 255,676

[22] Filed: Oct. 11, 1988

Related U.S. Application Data

[63] Continuation-in-part of Ser. No. 66,784, Jun. 26, 1987, Pat. No. 4,850,732.

[51] Int. Cl.⁵ .............................................. F16C 9/00
[52] U.S. Cl. .................................. 403/30; 403/408.1; 403/28
[58] Field of Search ................. 403/258, 259, 260, 28, 403/29, 30, 408.1

[56] References Cited

U.S. PATENT DOCUMENTS

| | | | |
|---|---|---|---|
| 3,107,950 | 10/1963 | Kleven | 411/337 X |
| 3,172,689 | 3/1965 | Glaser | 403/30 |
| 4,299,018 | 11/1981 | Bickerstaff et al. | 403/30 X |
| 4,512,699 | 4/1985 | Jackson et al. | 403/408.1 X |
| 4,668,116 | 5/1987 | Ito | 403/258 |

FOREIGN PATENT DOCUMENTS 1229389  4/1971  United Kingdom ............ 403/259

Primary Examiner—Andrew V. Kundrat
Attorney, Agent, or Firm—John R. Duncan

[57] ABSTRACT

A fastener for connecting structures having significantly different coefficients of thermal expansion (CTE) which substantially eliminates thermal stress with varying ambient temperatures, while allowing said structures to be either abutting or spaced from each other. A frusto-conical bore through a wall of a first structure receives a frusto-conical surface of an elongated fastener which is coincident with said bore. The fastener has a base secured to a second structure. A shoulder is formed on the first structure around the narrow end of the bore, the shoulder having a frusto-conical outer edge. A flange member is secured to the vertex end of said fastener, the flange member having a surface configured to engage the outer edge in a coincident relationship. The fastener is tightened to bring both pairs of coincident conical surfaces into pressure contact. Both parts of conic surface preferably have a common vertex which lies outside the fastener. The fastening system is particularly useful in cases where low-CTE plates or other contiguous structures are to be fastened together by a high-CTE fastener.

4 Claims, 1 Drawing Sheet

CO-CONIC FASTENER AND FASTENING METHOD

CROSS-REFERENCE TO RELATED APPLICATION

This application is a continuation-in-part of copending U.S. patent application Ser. No. 066784, filed June 26, 1987, now Pat. No. 4,850,732 and assigned to the assignee of this application.

BACKGROUND OF THE INVENTION

This invention relates in general to means for fastening structures together and, more specifically, to fasteners which resist the transfer of thermal stresses from one structure to the other.

Many difficulties have been encountered, particularly in aerospace applications, in attempting to design fasteners which are free of the thermal stress which results from differential thermal expansion between dissimilar fastener and sheet materials. For example, the coefficient of thermal expansion (CTE) of carbon-carbon materials is approximately an order of magnitude lower than the CTE of typical fastener materials. This thermal expansion mismatch can cause failure of the carbon-carbon material around a standard, snug-fitting, cylindrical fastener. A clearance left around the fastener to accommodate the fastener expansion upon heating can make the joint unacceptably loose at low temperatures.

Various conical or biconic fasteners have been developed in an attempt to overcome this problem. Typically are the "daze" fastener system disclosed by Jackson et al. in U.S. Pat. No. 4,512,699, the various biconic fasteners and rotating bearings disclosed by Kleven in U.S. Pat. No. 3,107,950 and the various biconic and curved surface fasteners described by Blosser et al. in their paper, "Theoretical Basis for Design f Thermal-stress-free Fasteners", NASA Technical Paper 2226, Dec. 1983.

Each of these utilize a bolt-type fastener for fastening two plates of dissimilar material in a face-to-face, pressed together, arrangement. Basically, these bolts consist of a through-bolt having one or a pair of conical washers in conical recesses in the outer plate surface, so as the through-bolt is tightened, the conical washer surfaces are pressed against the recesses, tightening the plates together. In most cases, the vertices of the conical washers are coincident, substantially lying in the plane of contact of the two plates.

Since the patentees and authors of the cited documents recognize that this basic biconical fastener does not entirely eliminate the differential CTE problem, especially where the material CTE's are not isotropic, they describe a large number of variations and alternatives in an attempt to meet specific problems. Typical of these are the concave and convex surfaces of Blosser et al., the enlarged, hollow and malleable conical heads of Jacobson et al., and the intermediate ball bearings and roller bearings proposed by Kleven.

Thus, there is a continuing need for improved fasteners for securely connecting two or more structures while eliminating any damaging stresses due to differences in CTE and limiting the heat flow between the structures.

SUMMARY OF THE INVENTION

A substantially thermal-stress-free fastener for fastening together two or more structures having two frusto-conical mating surfaces, one within the other, both of which have a common vertex. Plates or other low-CTE structures to be secured in an abutting arrangement are placed together or provided with a frusto-conical bore extending therethrough, with a shoulder or washer around the vertex end. The shoulder has a frusto-conical outer edge. An elongated fastener has a frusto-conical outer surface complimentary to said bore. The fastener is of higher CTE material, such as metal, and includes a flange secured by an axial bolt to the vertex end having frusto-conical surface complimentary to said outer edge surface.

The fastener is adapted to be inserted into said bore so that said outer surface and bore are coincident. The flange is placed over the vertex end of the fastener and said axial bolt is inserted and tightened to draw the flange frusto-conical flange surface into snug engagement with said frusto-conical outer edge surface. The fastener will remain snug at widely varying temperatures without imparting significant thermal stress into the low CTE material.

Where the material having the low CTE has high thermal conductivity, it is often preferred to secure a bushing, preferably with a spherical outer surface, into an opening in the low CTE structure. The bushing is formed from a low thermal conductivity material having substantially the same CTE as the structure. For example, with low CTE carbon-carbon materials, ceramic bushings give excellent results. The fastener is preferably formed from a metal having the desired strength or other characteristics.

BRIEF DESCRIPTION OF THE DRAWING

Details of the invention, and of certain preferred embodiments thereof, will be further understood upon reference to the drawing, wherein.

DETAILED DESCRIPTION OF THE INVENTION

Figure 1:
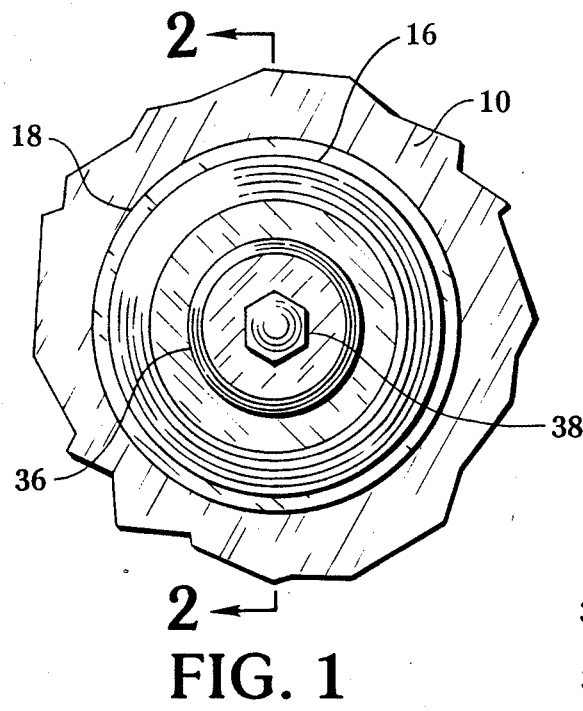
FIG. 1 is a plan view of the fastener assembly.
Figure 2:
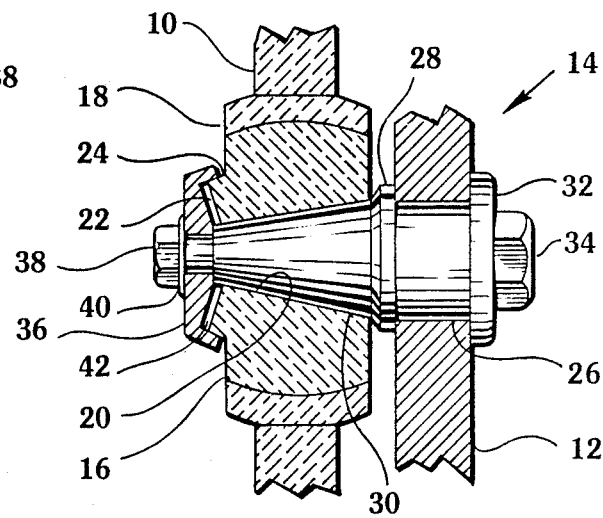
FIG. 2 is a section view taken on line 2—2 in FIG. 1.

Referring now to FIGS. 1 and 2, there is seen a first structure 10 made up of a material having a very low coefficient of thermal expansion such as carbon-carbon, certain ceramics, low CTE fiber reinforced composites, etc. First structure 10 is secured to a second structure 12 in a spaced relationship by a fastener 14, which is shown only partially in section for clarity.

Where first structure 10 is formed from a low CTE but relatively brittle material, such as carbon-carbon, I prefer to connect fastener 14 to structure 10 through a bushing 16 of higher strength material which has a CTE substantially the same as that of structure 14, but with a thermal conductivity much lower than that of structure 14. Typically, with a carbon-carbon structure 10, bushing 16 may be a silica-silica composite ceramic material. Preferably, bushing 16 has a spherical outer surface within a retainer 18 integral with structure 10. If desired, bushing 16 need not be secured to retainer 18 to permit limited rotation of the bushing relative to the retainer for ease of alignment during assembly.

Bushing 16 has a frusto-conical bore 20 therethrough with a raised shoulder 22 around the vertex end of bore 20. Shoulder 22 has a frusto-conical outer edge 24. The conic surfaces of bore 20 and edge 24 have a common vertex.

The body of fastener 14 has a cylindrical portion 26 extending through a cylindrical opening in second structure 12, a flange 28 abutting the inner surface of structure 12, and a frusto-conic section 30 coincident with bore 16.

Fastener 14 is secured to second structure 12 by a washer 32 and bolt 34 threaded into cylindrical portion 26.

A flanged member 36 is secured to the vertex end of conical section 30 by a bolt 38 (threaded into conical section 30) and washer 40. Flanged member 36 has an inwardly-directed frusto-conical surface 42 which is coincident with edge surface 24. Bolt 38 is tightened to bring each pair of coincident conical surfaces into a snug relationship.

Figure 3:
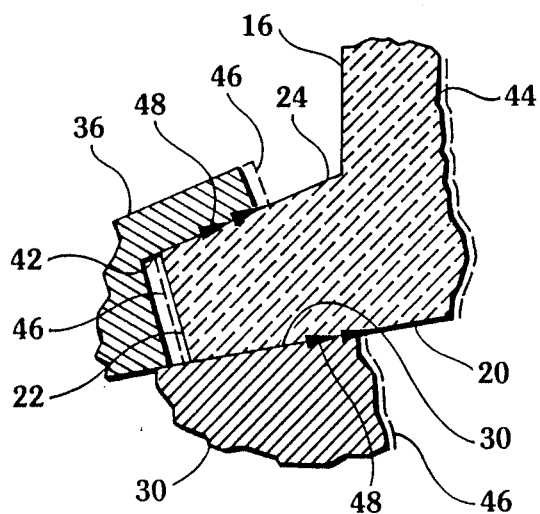
FIG. 3 is a detail section view illustrating the differential thermal expansion of the fastener components.

FIG. 3 schematically illustrates the response of the assembly to increased temperature. As the detailed portion shown in FIG. 3 shows, bushing 16, which has a low CTE, expands to a slight degree as illustrated by broken line 44 while metallic section 30 and flanged member 36, having a much higher CTE, expands to the extent shown by broken lines 46. Slippage direction is indicated by arrows 48. Expansion is, of course, exaggerated in FIG. 3 for clarity. Thermal expansion occurs parallel to the conic surfaces as measured from the vertices of the cones. Thus, the assembly remains firmly and snugly in engagement without developing undue thermal stresses despite significant temperature changes.

Figure 4:
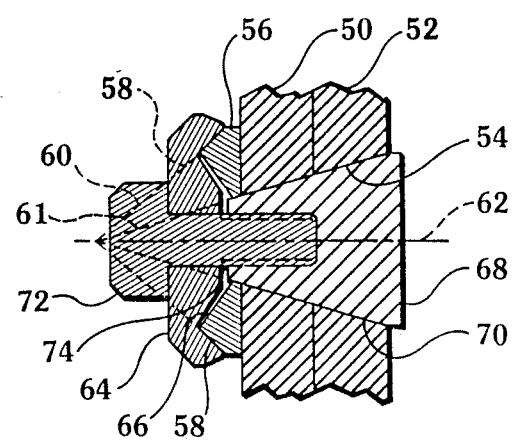
FIG. 4 is an axial section through an embodiment useful in securing abutting plates or other structures together.

The embodiment shown in axial section in FIG. 4 is primarily useful in securing two abutting plates 50 and 52 together. In plan view, this embodiment would appear similar to that shown in FIG. 1. Plates 50 and 52 could, of course, be abutting portions of larger, more complex, structures.

A frusto-conical bore 54 is formed in plates 50 and 52 by any conventional method such as machining, molding during plate manufacture, etc.

A washer 56 is placed on the surface of plate 50 around apex end of bore 54. Ordinarily, washer 56 would be made from the same material as plates 50 and 52, although it could be another material having a CTE similar to that of the plate material. If desired, washer 56 could be formed integral with plate 50, similar to raised shoulder 22 as seen in FIG. 2.

The outer edge of washer 56 has a frusto-conical surface 58. The apex of frusto-conical surface 56 is shown by broken lines 60. That apex is coincident with the apex of frusto-conical bore 54, as indicated by broken lines 60 and lies along the fastener axis 62, as indicated by broken line 62.

A flanged member 64 (generally similar to flanged member 36 as seen in FIGS. 2 and 3) has an inwardly-directed frusto-conical surface 66 which is coincident with frusto-conical surface 58 of washer 56.

A fastener body 68 substantially fills bore 54 and has a conical outer surface 70 coincident with bore 54.

Flanged member 36 is secured to the vertex of fastener body 68 by a bolt 72 having a head bearing on the outer surface of washer 64 and a threaded shank 74 threaded into body 68 and adapted to a draw washer 64 toward body 68, bringing the contacting conical surfaces into intimate contact.

The arrangement shown in FIG. 4 maintains uniform, snug contact despite varying temperatures in the same manner as detailed in the description of FIG. 3.

While certain preferred materials, relationships and dimensions were detailed in the above description of preferred embodiments, these may be varied where suitable with similar results. For example, if first structure 10 has sufficient strength, the conical surfaces may be formed or machined directly in the structure material and bushing 16 need not be used, although in many cases bushing 16 is preferred.

Other variations, applications and ramifications of the present invention will occur to those skilled in the art upon reading this disclosure. Those are intended to be included within the scope of this invention, as defined in the appended claims.

I claim:

1. A co-conic substantially stress free fastener for structures having substantially different coefficients of thermal expansion which comprises:
   at least two abutting structures to be secured together;
   a frusto-conical bore through said structures, extending through the interface;
   a washer on the apex side of said structures surrounding said bore;
   said washer having a frusto-conical outer edge;
   said bore and edge having different cone angles but substantially the same vertex;
   a fastener body having an outer frusto-conical surface substantially coincident with said bore;
   a flanged member adjacent to the vertex end of said fastener body having a frusto-conical surface coincident with said frusto-conical outer edge surface; and
   means for tightening said fastener by moving said flanged member toward said fastener body to bring both pairs of coincident surfaces into pressure contact;
   whereby said structures and fastener are held together in a substantially stress-free relationship despite changes in ambient temperature.

2. The fastener according to claim 1 wherein said means for tightening said fastener comprises a bolt extending through the center of said flanged member into a threaded hole in the vertex end of said conical section.

3. A co-conic fastener which comprises a frusto-conical fastener body adapted to fit a frusto-conical bore through structure to be secured together;
   a one-piece, unitary washer adjacent to the apex end of said fastener body; said washer having a frusto-conical outer edge;
   said body and washer outer edge having different cone angles but substantially the same vertex;
   a flanged member adjacent to the apex end of said fastener body having a frusto-conical surface coincident with said frusto-conical outer edge surface; and
   means for tightening said fastener by moving said flanged member toward said fastener body.

4. A method of securing contiguous structures together with a fastener having a significantly different coefficient of thermal expansion which comprises the steps of:
   forming a frusto-conical bore through said structure across the contacting surfaces;

inserting a corresponding frusto-conical fastener body into said bore, said body having a threaded opening in the apex end thereof;

placing a one-piece, unitary washer against the structure surrounding the apex end of said bore, said washer having a frusto-conical outer edge having a vertex substantially coinciding with the vertex of said frusto-conical body;

fitting a flanged member having a frusto-conical surface corresponding to said outer edge over said washer;

inserting a bolt through said flanged member into said threaded opening; and threading said bolt into said opening to tighten said fastener by moving said flanged member and body axially toward each other.

* * * * *